(12) United States Patent
Sprocq et al.

(10) Patent No.: US 8,833,072 B2
(45) Date of Patent: Sep. 16, 2014

(54) HYDRAULIC BRAKE BOOSTER COMPRISING A MOTOR

(75) Inventors: Raynald Sprocq, Esbly (FR); Chris Anderson, Paris (FR); Bastien Cagnac, Chantilly (FR)

(73) Assignee: Robert Bosch GmbH, Stuttgart (DE)

(*) Notice: Subject to any disclaimer, the term of this patent is extended or adjusted under 35 U.S.C. 154(b) by 902 days.

(21) Appl. No.: 13/054,730

(22) PCT Filed: Jul. 8, 2009

(86) PCT No.: PCT/EP2009/058687
§ 371 (c)(1),
(2), (4) Date: Jan. 18, 2011

(87) PCT Pub. No.: WO2010/006978
PCT Pub. Date: Jan. 21, 2010

(65) Prior Publication Data
US 2011/0120121 A1   May 26, 2011

(30) Foreign Application Priority Data

Jul. 17, 2008   (FR) ...................................... 08 04080

(51) Int. Cl.
| | | |
|---|---|---|
| F15B 7/06 | (2006.01) |
| B60T 13/12 | (2006.01) |
| B60T 13/74 | (2006.01) |
| B60T 13/16 | (2006.01) |

(52) U.S. Cl.
CPC ............ *B60T 13/162* (2013.01); *B60T 13/745* (2013.01)
USPC ........................................... 60/545; 60/547.1

(58) Field of Classification Search
USPC ........................................ 60/545, 547.1, 562
See application file for complete search history.

(56) References Cited

U.S. PATENT DOCUMENTS

| | | | |
|---|---|---|---|
| 4,703,978 A | 11/1987 | Belart et al. | |
| 5,713,640 A | * 2/1998 | Feigel et al. | ................ 60/545 |
| 6,494,546 B1 | * 12/2002 | Feigel | ..................... 303/113.4 |
| 7,127,891 B2 | * 10/2006 | Ohlig et al. | ................ 60/547.1 |
| 2009/0108670 A1 | 4/2009 | Ohlig | |

FOREIGN PATENT DOCUMENTS

| | | |
|---|---|---|
| CN | 1903628 | 1/2007 |
| DE | 3209337 | 9/1983 |
| DE | 3502474 | 7/1986 |
| DE | 3906411 | 9/1990 |
| DE | 4338906 | 5/1995 |
| EP | 0072745 | 2/1983 |
| FR | 2727370 | 5/1996 |

OTHER PUBLICATIONS

PCT/EP2009/058687 International Search Report and Written Opinion dated Oct. 21, 2009, 12 pages.

* cited by examiner

*Primary Examiner* — Michael Leslie
(74) *Attorney, Agent, or Firm* — Michael Best & Friedrich LLP

(57) ABSTRACT

The present invention relates chiefly to a hydraulic brake booster comprising a motor, preferably an electric motor. The main subject of the invention is a hydraulic brake booster comprising a thrust chamber (76) receiving, on command, a pressurized hydraulic fluid that drives a hydraulic piston (78) that drives a piston of a master cylinder, characterized in that it comprises a source of pressurized hydraulic liquid (116) provided with an electric motor (88) driving a hydraulic fluid pressuring device. The invention applies notably to the automotive industry. The invention applies mainly to the braking industry.

9 Claims, 7 Drawing Sheets

HYDRAULIC BRAKE BOOSTER COMPRISING A MOTOR

BACKGROUND OF THE INVENTION

The present invention relates chiefly to a hydraulic brake booster comprising a motor, preferably an electric motor.

It is known practice to produce hydraulic brake boosters (also known in English as hydroboost) which are supplied with pressurized hydraulic fluid from a hydraulic pump of a power steering device or of a master cylinder driven by a hydraulic brake booster as described for example in FR 2 727370.

Hydraulic boosters supplied by the power steering pump have very poor energy efficiency inasmuch as they are inserted in the hydraulic circuit of said pump with continuous circulation and an increase in pressure that is obtained by interrupting this circulation when a brake pedal is depressed. In addition, braking that coincides with the turning of the steering wheel reduces the effectiveness of the power steering, which the user finds unsatisfactory. The booster described in FR 2 727370 requires the use of a source of vacuum that is not necessarily available on modern-day vehicles, particularly diesel vehicles. In addition, a pneumatic booster occupies a great deal of space. Further, hydraulic boosters are limited by the saturation, the power and the travel of the pneumatic booster.

Other hydraulic boosters are described in DE 32 09 337, DE 43 38 906, DE 39 06 411 or EP 0 072 745.

SUMMARY OF THE INVENTION

The disadvantages of the hydraulic boosters of known type are avoided by the booster according to the present invention which comprises a thrust chamber supplied, on command, by a source of hydraulic liquid, advantageously brake fluid, which is pressurized by a source of which the compression means are driven, on command, by a motor, advantageously an electric motor. In this way, the source of the pressurized hydraulic fluid does not deliver except when it is necessary to supply the thrust chamber, thereby reducing the power consumption and size of the device. In addition, such a device makes it possible to supply the volumes and/or pressures required for rapid and effective operation of a modern braking system.

The main subject of the invention is a hydraulic brake booster comprising a thrust chamber receiving, on command, a pressurized hydraulic fluid that drives a hydraulic piston that drives a piston of a master cylinder, characterized in that it comprises a source of pressurized hydraulic liquid provided with an electric motor driving a hydraulic fluid pressuring device.

Another subject of the invention is a booster, characterized in that it further comprises a control unit for controlling the pressure and/or volume of the fluid delivered, on command, by the source to the thrust chamber.

Another subject of the invention is a booster characterized in that it comprises: a first set of moving gear comprising a component able to be driven by the member via which the driver actuates braking, typically a brake pedal; a second set of moving gear comprising a brake boosting actuator driving a force application element; a position sensor that senses the relative position of said first and second moving elements which are connected to one input of the control unit controlling the supply to the thrust chamber via the pressure source.

Another subject of the invention is a booster characterized in that the pressure source comprises a master cylinder driven on command by the motor.

Another subject of the invention is a booster characterized in that the master cylinder comprises an annular chamber.

Another subject of the invention is a booster characterized in that the pressure source comprises a pump driven by the motor.

Another subject of the invention is a booster characterized in that it comprises means of hermetically isolating, on command, the supply of pressurized fluid to the thrust chamber.

Another subject of the invention is a booster characterized in that it further comprises a master cylinder comprising means of connection to hydraulic braking circuits and a connection which, on command, allows brake fluid to be injected into a chamber of the master cylinder comprising means of communication with a hydraulic braking circuit.

Another subject of the invention is a booster characterized in that the connection for supplying a chamber of the master cylinder, comprising means of connection to a hydraulic braking circuit, opens into a resupply chamber of the master cylinder positioned between two cups pressed against the piston for the pressuring of said chamber.

Another subject of the invention is a booster characterized in that the connection opens directly into one of the chambers of the master cylinder provided with means of connection to a hydraulic braking circuit beyond the cups defining the resupply chamber.

Another subject of the invention is a booster characterized in that the active surface area of the thrust chamber is substantially equal to the effective surface area of at least one of the chambers of the master cylinder comprising means of connection to a hydraulic braking circuit.

Another subject of the invention is a booster characterized in that the effective surface area of the thrust chamber is smaller than that of the pistons of the master cylinder comprising means of connection to a hydraulic braking circuit so as to avoid undesired movement of the pedal in the event of active braking.

BRIEF DESCRIPTION OF THE DRAWINGS

The invention will be better understood by means of the following description and the attached figures which are given purely by way of nonlimiting example and in which.

DETAILED DESCRIPTION

In FIGS. 1 to 7 the same references have been used to denote the same elements.

Figure 1:
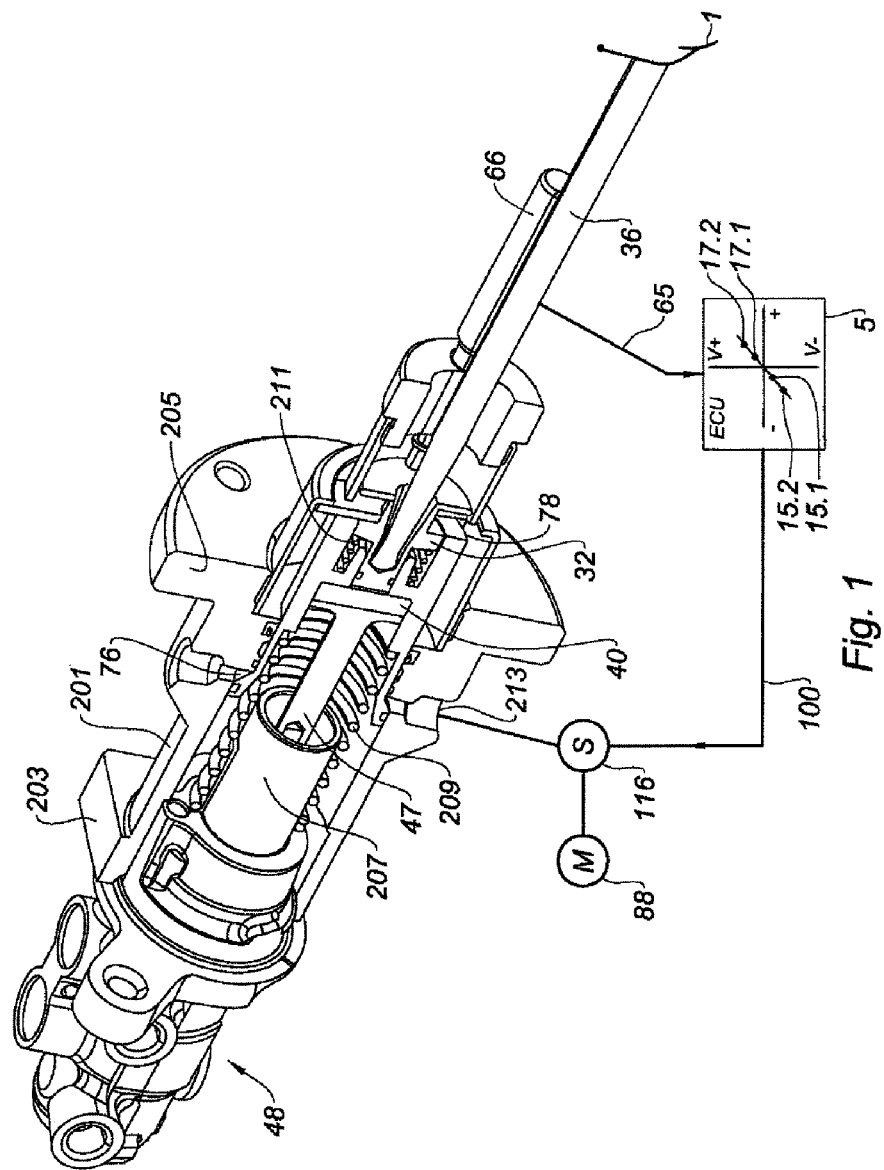
FIG. 1 is an axonometric projection with partial cutaway of a first exemplary embodiment of the booster according to the present invention.

FIG. 1 shows one exemplary embodiment of a booster according to the present invention associated, at the front, with a master cylinder 48, advantageously a tandem master cylinder. Advantageously, the booster comprises a substantially tubular body 201 of which the front part 203 accepts the rear part of the master cylinder 48 with, for example, a bolted attachment using bolts (not depicted) passing through openings made in flanges or the like. It is advantageous to be able to use standard master cylinders, or at most master cylinders that have been modified only slightly in relation to standard master cylinders normally used with pneumatic brake boosters. The rear part 205 comprises a flange for securing it to the bulkhead of the vehicle. Inside a bore of the body 201 is a hydraulic piston 78 which with said bore delimits a thrust chamber 76. Advantageously, the booster according to the present invention is provided with a reaction device, such as a reaction disk 40 positioned, in the example illustrated, in a housing of the piston 78, the face of which housing forms the shoulder for bearing against the rear face of the disk 40 and which has a central opening to accept a plunger 32. The ratio of the surface areas between that of the shoulder of the pneumatic piston and that of the front face of the plunger 32 able to bear against the rear face of the disk 40 determines the boost ratio of the booster. A distance at rest between the front face of the plunger and the rear face opposite belonging to the reaction disk, measured along the axis of the booster-master cylinder assembly, determined the jump. A thrust rod 47 bears against a front face of the reaction disk 40 and against the rear of a primary piston 207 of the master cylinder. A return spring 209, advantageously a helical spring, returns the hydraulic piston 78 to its rest position. Likewise, a return spring 211, of lower spring rate, returns the plunger 32 to its rest position. A control rod 36 receives the thrust from a brake pedal 1 and transmits it to the plunger 32.

A connection 213 supplies pressurized fluid, advantageously pressurized brake fluid to the thrust chamber 76 from a pressure source 116 provided with moving elements for pressurizing the fluid which is driven directly or indirectly by a motor 88, advantageously an electric motor. The source 116 advantageously comprises a pump, preferably a piston pump, more preferably still comprising an odd number of pistons equal, for example, to three or five. The pressurizing means may be connected directly to the chamber 76 in which case the increase in pressure in this chamber is obtained by starting up the means of pressurizing the source 116. As an alternative, the source 116 stores pressurized fluid and comprises means of hermetic isolation, advantageously at least one electrically operated valve, so as on command 100 to deliver pressurized fluid to the thrust chamber 76. In the advantageous example illustrated, the booster comprises a sensor 66, advantageously a position sensor, more preferably still a position sensor that senses the relative position of a first set of moving gear connected to the brake pedal 1 with respect to the position of a second set of moving gear connected to the piston 78 providing the brake boosting. Of course other sensors may be used, for example an absolute position sensor that senses the absolute position of the control rod 36, a strain gauge that gauges the force applied to this rod, a pressure sensor that senses the pressure obtaining in the braking circuits and/or at the source 116, or the like. In the advantageous example illustrated, the sensor 66 delivers a signal 65 to a control unit 5 (or ECU which stands for Electronic Control Unit) which in turn delivers a control signal 100 to the pressure source 116. Advantageously, the control unit 5 comprises a program for controlling the pressure source 116 on the basis of the relative positions of the two sets of moving gear, it being possible for the position of equilibrium sought by the control unit 5 setpoints to be zero or, advantageously, to correspond to an offset so as, as symbolically depicted in the figures by the points 15.1, 15.2, 17.1 and 17.2, dynamically on command, to increase or decrease the jump during the braking action.

The booster according to the present invention offers high operational safety inasmuch as, in the event of a fault with the source 116, only the return spring 209 opposes (unboosted) braking, allowing a defective vehicle to be brought to a standstill. The force that has to be applied, notably in such an instance, can be further limited by choosing a small diameter for at least one of the bores of the master cylinder 48.

Figure 2:
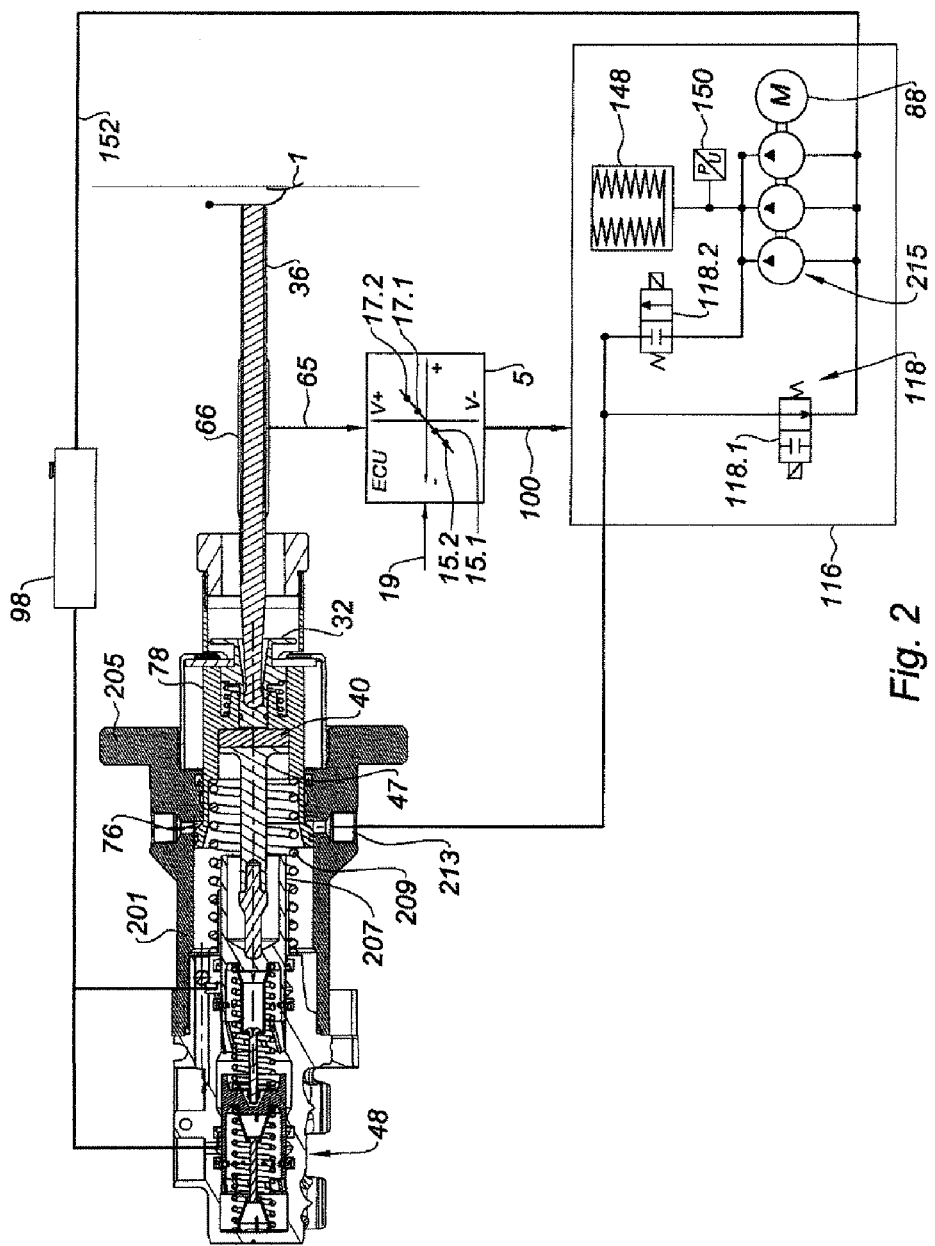
FIG. 2 is a view in section with hydraulic diagram of a second exemplary embodiment of a booster according to the present invention.

FIG. 2 shows one exemplary embodiment of a booster according to the present invention in which the pressure source 116 comprises a pump 215 driven by an electric motor 88. Advantageously, the source 116 comprises means 118 of hermetically isolating, on command, advantageously at the command of the control unit 5, the connection 213 that supplies the thrust chamber 76. In the example illustrated in FIG. 2, the means of hermetic isolation 118 comprise a first electrically operated valve 118.1 which, on command, upon brake release or reduction in braking effort, makes brake fluid return to a brake fluid reservoir 98. Return is, for example, via a line 152 connecting the outlet of the electrically operated valve 118.1 and the low-pressure inlet of the pump 215 to the reservoir 98.

Moreover, the reservoir 98 supplies the master cylinder 48 with brake fluid at atmospheric pressure by gravity feed.

Advantageously, the means of hermetic isolation also comprise an electrically operated valve 118.2 which, on command, advantageously on the command of the control unit 5, connects the high-pressure outlet of the pump 215 to the connection 213 of the thrust chamber 76. Although use of the proportional electrically operated valve is not outside the scope of the present invention, the electrically operated valves used in the various alternative forms of the booster according to the present invention advantageously use on-off electrically operated valves, advantageously controlled using pulse width modulation (PWM).

Advantageously, the pressure source 116 comprises, connected to the high-pressure outlet of the pump 215, a pressurized brake fluid accumulator 148 which allows the pump 215 motor 88 to be operated only when required, for example when the pressure at the outlet of the pump 215/of the accumulator 148 drops below a desired low-pressure threshold detected, for example, by a pressure sensor 150.

When the driver presses the pedal 1 with his foot, firstly he actuates the control rod 36, the plunger 32, the reaction disk 40, the thrust rod 47 and the primary piston 207 of the master cylinder. The increase in pressure in the primary chamber causes the secondary piston of the master cylinder 48 to move. Also, the brake setpoint is detected by a sensor, for example the sensor 66 which sends a signal to the control unit 5 to provide a supply of pressurized fluid, from the source 216 to the thrust chamber 76 simultaneously boosting the braking. Moreover, the control unit 5 may, by a link 19, receive additional information from other sensors and/or control units of the vehicle. For example, it may receive an automatic braking command without the driver depressing the pedal 1. Such braking is also brought about by supplying the chamber 76 with pressurized fluid via the connection 213. It should be noted that, in the example illustrated in FIG. 2, the brake pedal 1 is automatically depressed during automatic braking.

Advantageously, at least some of the devices of the source 116 are used to modulate the braking and in particular for the antilock braking system (ABS) the automatic slip reduction (ASR) the electronic stability program (ESP) or the like.

Operation of the pump 215, of the motor 88, of the sensor 150 and, possibly, of the accumulator 148 and of the hermetic isolation means 118 which are common, allows the cost of the vehicle braking system to be reduced and/or allows additional functionality to be offered for a moderate increase in cost.

Figure 3:
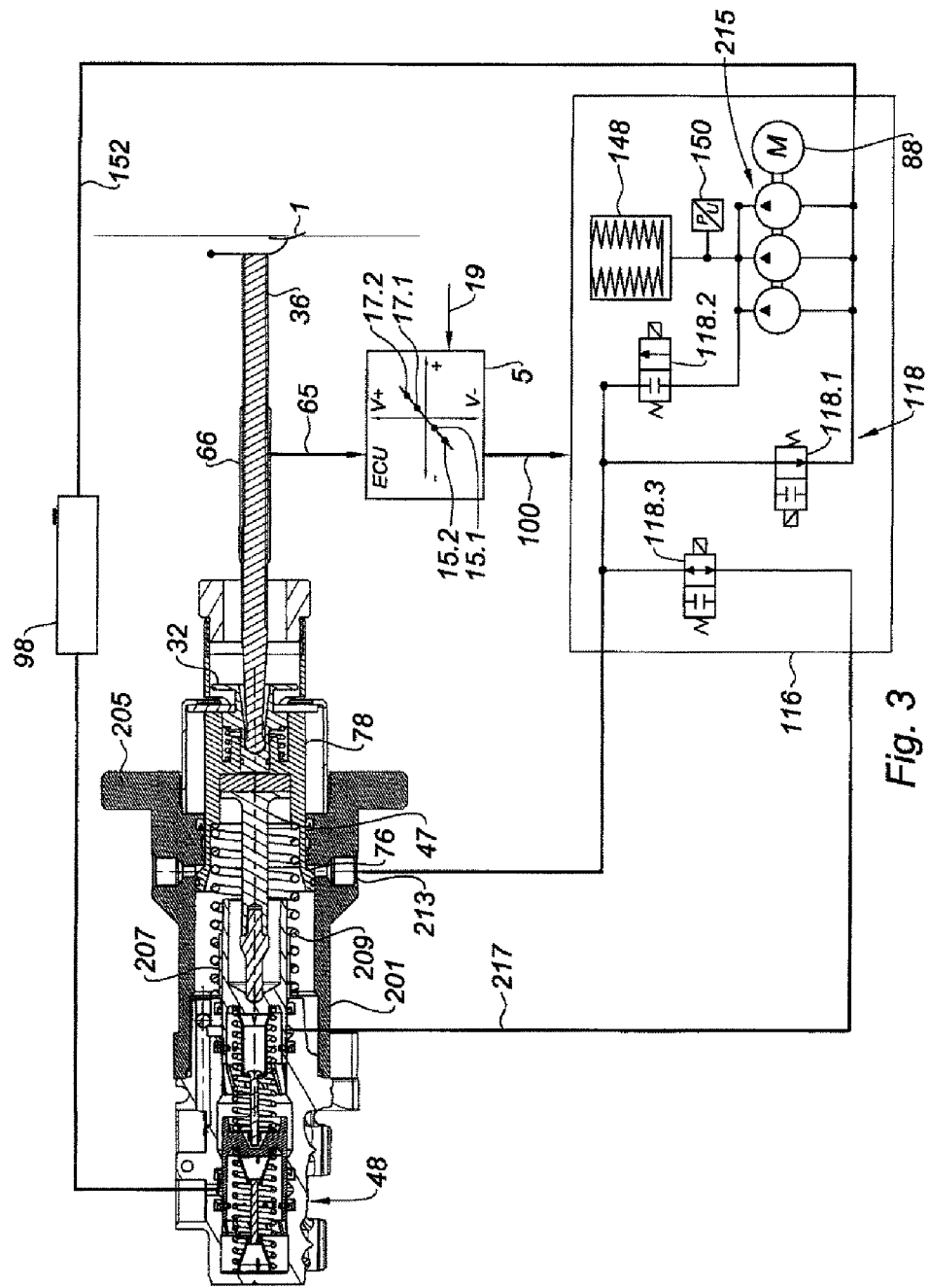
FIG. 3 is a view in section with a hydraulic diagram of a third exemplary embodiment of a booster according to the present invention.

FIG. 3 shows an alternative form of embodiment of the booster of FIG. 2, in which the means 118 of hermetically isolating the source 116 further comprise a third electrically operated valve 118.3 which, on the command of the control unit 5, connects the high-pressure outlet of the pump 215, of the accumulator 148 and/or of the electrically operated valve 118.2 to one of the chambers of the master cylinder 48, for example, as illustrated, to the primary chamber of said master cylinder 48. In a first alternative form of embodiment, a supply pipe 217 which, on command, supplies the primary chamber of the master cylinder, opens into a resupply chamber of the master cylinder positioned between two cups pressed against the primary piston 207. In such an instance, a leak at the valves 118.3 and 118.1 does not compromise braking safety inasmuch as the cups oppose any reduction in pressure in the chamber of the master cylinder. However, in such an instance, it is necessary to ensure hermetic isolation of the resupply chamber with respect to the reservoir 98 so as to avoid pressurized braking fluid being introduced into this reservoir. In a first alternative form which has not been illustrated an additional electrically operated valve is placed on the connection supplying the chamber of the master cylinder and the reservoir 98. In the advantageous example illustrated, the direct connection between the reservoir 98 and the resupply chamber/primary chamber of the master cylinder 48 is quite simply eliminated. Specifically, resupplies and returns of a brake fluid to the reservoir 98 take place via the line 217, the electrically operated valve 118.3, the electrically operated valve 118.1 and the line 152.

The opening of the valve 118.3 at the command 100 of the control unit 5 allows the primary chamber of the master cylinder 48 to be prefilled and/or filled to allow operation of active modes, that is to say modes that do not require the pressing of the pedal 1 of the braking system, for example for automatic braking at the command of a radar (ACC), parking braking or the like.

The increase in pressure in the primary chamber of the master cylinder 48 pushes the secondary piston which in turn causes the pressure in the secondary circuit to rise.

Advantageously, the effective surface area of the thrust chamber 76 is tailored to suit the effective surface area of the primary piston and/or the secondary piston of the master cylinder 48.

For example, the effective surface area of the thrust chamber 76 is increased in relation to that of the chambers of the master cylinder if there is a desire to compensate for a low pressure (for example restricted to 107 Pa) of the source of pressured brake fluid. However, such a ratio between the surface areas carries the risk of causing the brake pedal 1 to move in the active modes.

For the same surface areas, the saturation pressure, that is to say the maximum pressure supplied by the high-pressure source is equal to the pressure generated by the boost output from the master cylinder. The pedal 1 remains stationary during the active modes.

For effective surface areas of the thrust chamber 76 which are smaller than those of the pistons of the master cylinder, the volume of fluid that needs to be supplied to the chamber 76 for a given braking action is reduced, making it possible to limit the output of the pump, to reduce the volume of the accumulator and/or to improve the dynamic response of the braking, that is to say to reduce the response time of the braking system.

Figure 4:
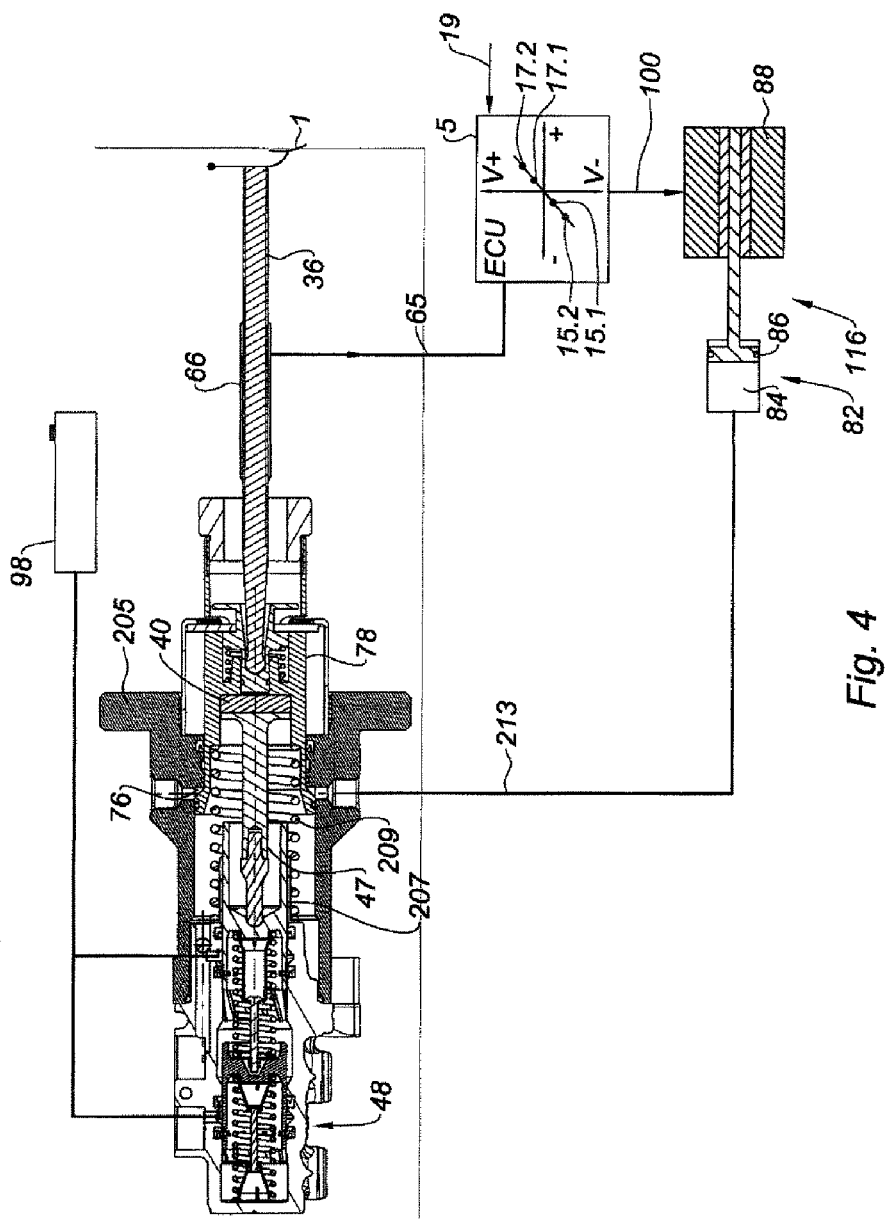
FIG. 4 is a view in section with a hydraulic diagram of a fourth exemplary embodiment of a booster according to the present invention.

FIG. 4 shows one exemplary embodiment of the booster according to the present invention in which the source 116 that supplies the thrust chamber 76 comprises a master cylinder 84 provided with a piston 86 driven translationally by an electric motor 88 provided with means of translationally driving the piston 86. For example, the motor 88 is a rotary motor operated by said means of translationally driving the piston 86 which comprises a screw, advantageously a recirculating ball screw.

Figure 5:
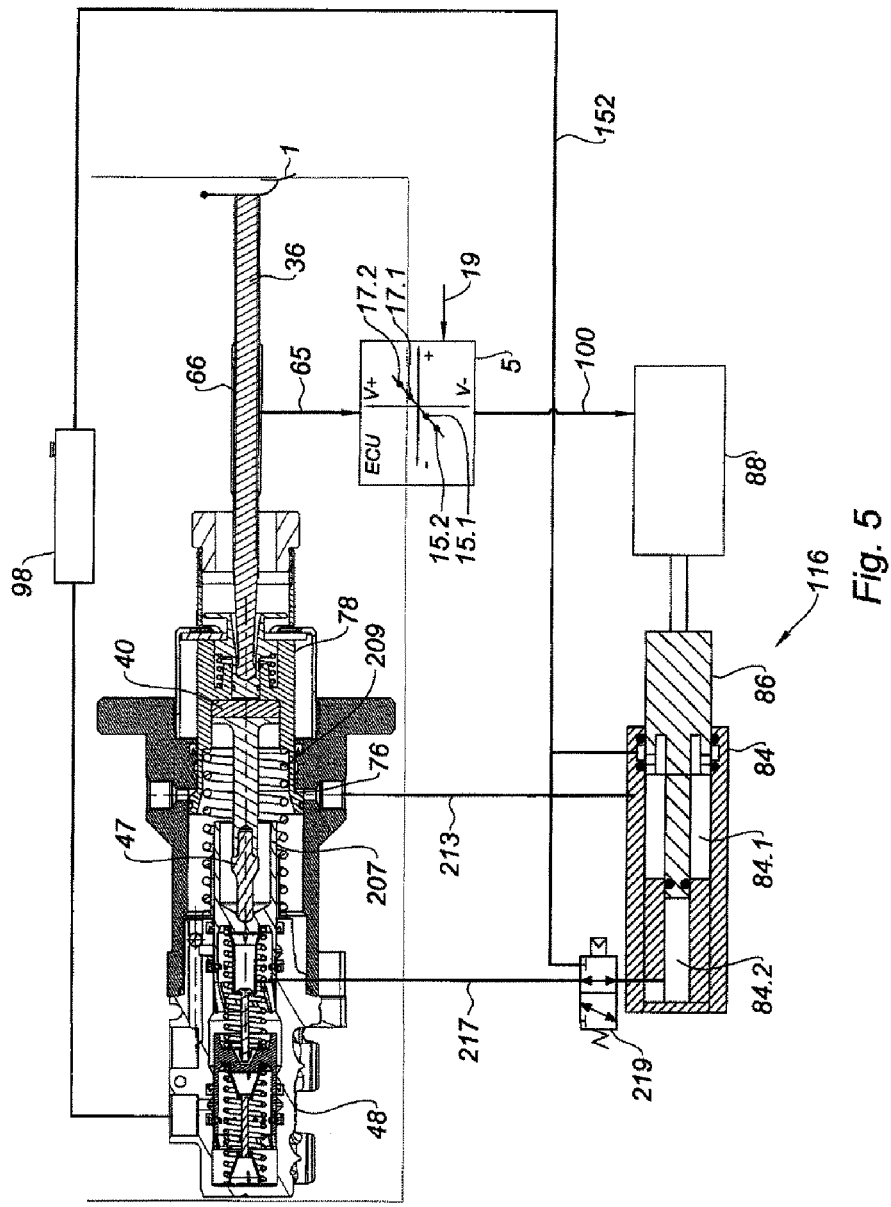
FIG. 5 is a view in section of a fifth exemplary embodiment of a booster according to the present invention.
Figure 6:
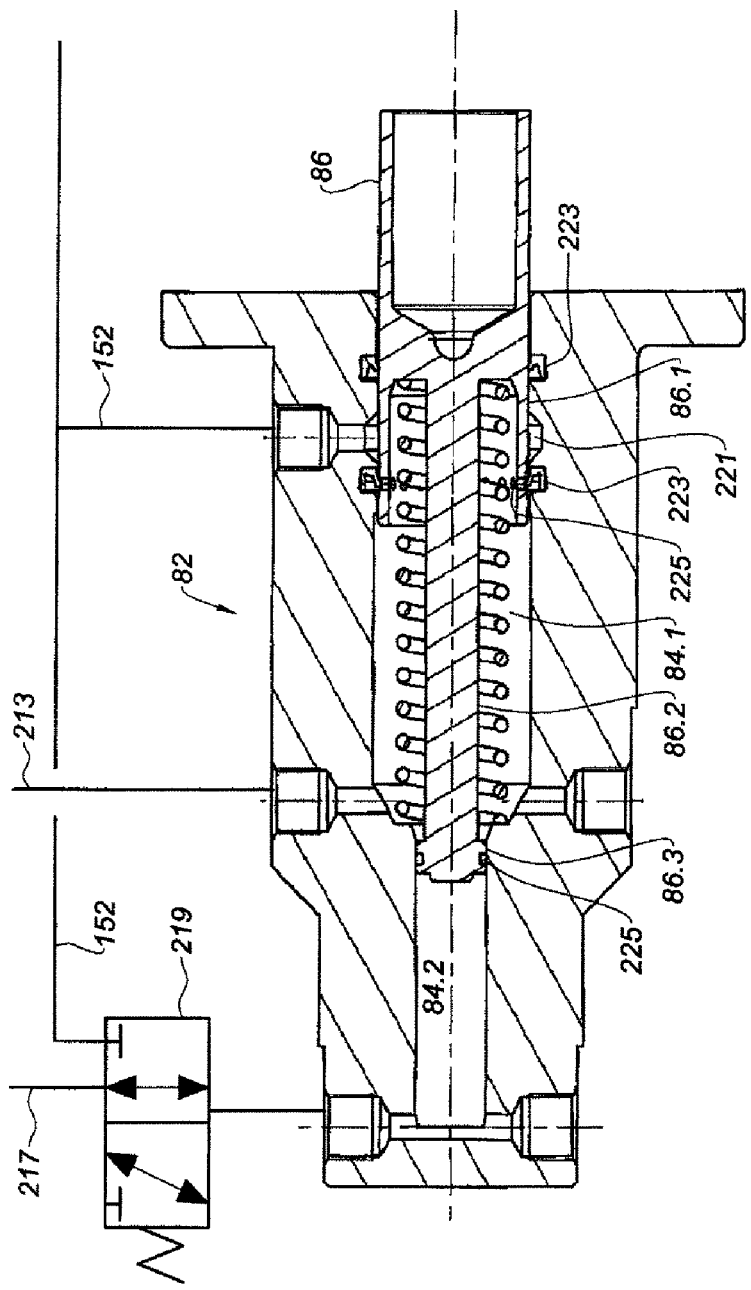
FIG. 6 is a view in section on a larger scale of a device for supplying pressurized fluid for the booster of FIG. 5.

FIG. 5 shows an advantageous exemplary embodiment of a booster according to the present invention, in which the thrust chamber 76 is supplied by a motorized master cylinder 84. In the advantageous example, the master cylinder 84 is a tandem master cylinder illustrated in greater detail in FIG. 6 and the primary chamber 84.1 of which supplies the connection 213 of the thrust chamber 76 and a secondary chamber 84.2 of which via a connection 217 supplies the primary chamber of the master cylinder 48. It should be noted that in such instances, supply is preferably directly into the chamber of the master cylinder rather than into the resupply chamber thereof. Advantageously, as illustrated, only the secondary chamber of the master cylinder 48 is supplied, by gravity feed, by the reservoir 98 of brake fluid at atmospheric pressure. Advantageously, a two-way electrically operated valve 219 on command, under braking, connects the secondary chamber 84.2 of the master cylinder 84 to the primary chamber of the master cylinder 48 that supplies the braking circuit. In this position, the valve 219 simultaneous hermetically isolates the line 217 that supplies the primary chamber of the master cylinder 48 from the line 152 connected to the reservoir 98.

In a second position, with no braking, the valve 219 isolates the line 217 from the secondary chamber 84.2 of the master cylinder 84 (and from the line 152 connected to the reservoir 98) and connects the line 152 to the secondary chamber 84.2 of the master cylinder 84. Advantageously, the connection 152 is also connected permanently to a chamber 221 for resupply of the primary chamber 84.1 of the master cylinder 84. Said resupply chamber 221 is delimited in a bore of the master cylinder 84 by two cups 223 pressed against the primary part of the piston 86. Said piston 86 has resupply holes 225 advantageously located radially at regular intervals so that at rest, that is to say when the piston 86 is retreated as far as it will go (to the right in FIG. 6), the primary chamber 84.1 of the master cylinder 84 is placed in communication with the line 152 connected to the reservoir 98. The forward movement of the piston 86 moves the resupply holes 125 which travel beyond the front cup 123, at that moment isolating the line 152 from the primary chamber 84.1.

With the electrically operated valve 119 not activated, actuation of the brake pedal gives rise, according to the setpoint of the control device, to a displacement of hydraulic fluid from the primary chamber of the master cylinder 84 to the working chamber 76. At the same time, the volume swept by the secondary chamber of this same master cylinder will be transferred to the reservoir without any increase in pressure through the electrically operated valve 219 and the line 152. The latter displacement of fluid will therefore have no impact on the braking characteristic. The relationship between the input travel of the control rod 36 and the pressure of the primary and secondary chambers of the master cylinder 48 will therefore be dependent on the respective cross sections of the chambers of the latter master cylinder and of those of the braking receivers (brakes) of the vehicle, as in conventional "non-decoupled" braking systems.

With the electrically operated valve 119 activated, because of the complete separation of the two chambers of the master cylinder 84, actuation of the brake pedal will, according to the setpoint of the control device, cause simultaneous displacement of hydraulic fluid from the primary chamber of the master cylinder 84 to the working chamber 76, and from the secondary chamber of the latter master cylinder to the primary chamber of the master cylinder 48. The capacity of the latter volume of fluid will be dependent on the cross section of the secondary chamber of the master cylinder 84. This volume which is in addition by comparison with the braking situation described in the previous paragraph contributes to filling the primary and secondary braking circuits of the vehicle. What this means is that the input travel of the control rod 36 needed to achieve a given braking circuit pressure will be shortened by an amount that is proportional to the cross section of the secondary chamber of the master cylinder 84. It is thus possible, with a braking system of the type said to be non-decoupled and which therefore offers advantages in terms of robustness and pedal feel over a so-called "decoupled" system using a simulator, to obtain an input travel/circuit pressure braking characteristic that is shorter, while at the same time retaining a conventionally sized master cylinder 48 so as to achieve the emergency braking performance (in the event of brake booster failure) required by the legislation.

Conversely, a vehicle which relies on an electronic system of the HBC type, that is to say in which pressure is generated by the hydraulic unit of the ESP device in order to compensate for any potential failure of the brake booster in order to meet the regulations so as to be able to retain an acceptable pedal travel in normal braking mode can benefit from the invention in order to improve on robustness. Thus, for example, a complete electrical power failure in the vehicle will have no impact on the emergency braking performance, unlike cases in which the vehicle relies on the electronic function in order to be able to achieve the stopping distances required by the legislation.

Moreover, this device can be used as a function that allows the driver to select between two braking system behaviors. The choice is made via a user interface, for example by pressing a control key or by choosing from a vehicle setup menu. For example, a "normal" mode in which the electrically operated valve 119 is in the unactivated position and a "sports" mode in which the electrically operated valve 119 is activated, thus offering the driver a shorter pedal better suited to sporty driving.

Advantageously, the bores of the primary 84.1 and secondary 84.2 chambers of the master cylinder 84 have different diameters. For preference, the diameter of the secondary chamber 84.2 is smaller than the diameter of the primary chamber 84.1. Thus, the shortening of the pedal obtained when the electrically operated valve 119 is activated is not excessive, and will not result in too harsh a braking characteristic that the driver could find unpleasant.

Advantageously, a single piston 86 between two pistons linked mechanically in terms of translation on the axis of the master cylinder 84 pressurizes the brake fluid present in the chambers 84.1 and 84.2. In the advantageous example illustrated, the single piston 86 has a rear tubular region 86.1 against which there rest the cups 223 extended forward as far as the chamber 84.2 by a coaxial rod 86.2 ending in a disk 86.3 forming a secondary piston equipped with a groove to accept a seal 225, for example an O-ring.

The piston 86 is involved in supplying the chamber of the master cylinder 48 and the thrust chamber 76 but the length and diameters of the pistons also determine the volumes that are to be injected.

Moreover, in normal braking mode, that is to say in a braking mode that results from the fact that the driver is pressing the pedal 1 with his foot, it is possible, according to the invention, by injecting a volume of liquid into the primary and/or secondary chamber of the master cylinder 48, to shorten the pedal travel obtained, this shortening of the pedal travel in normal operation making it possible to select a small-diameter master cylinder which, were the device of the present invention not available, would result in a pedal travel that was too long to be acceptable to the user. However, the reduction in the diameter of the master cylinder is masked by the injection of brake fluid into the primary and/or secondary chamber of the master cylinder 48. For example, it is possible to use master cylinders 48 with diameters ranging between 2 mm and 50 mm, preferably between 10 mm and 40 mm, more preferably still between 19.6 mm and 33 mm and for example of 22.2 mm, 23.8 mm or 25.4 mm.

The reduction in the diameter of the master cylinder for the same pedal travel, or even a pedal travel that is reduced to improve driver comfort under normal braking circumstances also allows the pressure in the brakes to be increased for a given force applied to the pedal 1 in the event of failure of the pressure source 116. It should be noted that, in the event of such a failure, with a reduced-diameter master cylinder, the failure is cured by increasing the pedal travel in the failure situation (which can no longer be masked if there is no injection of brake fluid into the primary and/or secondary chamber of the master cylinder 48). However, this increase in the travel of the pedal will be entirely acceptable inasmuch as it occurs only under exceptional circumstances (only in the event of failure of the pressure source 116) and inasmuch as it improves the effectiveness of the braking particularly for drivers incapable of applying too great a force to the brake pedal, notably the elderly and certain women).

Likewise, the present invention is particularly advantageous for hybrid vehicles that comprise a combustion engine and an electric motor capable of operating as a generator to recharge the batteries under braking. Specifically, the regenerative braking by the electric motor operating as a generator has to be supplemented in order to obtain the desired braking. Thus, active braking may correspond to this top-up braking while at the same time allowing a normal pedal feel. The control rod 36 and the thrust rod 47 are decoupled by injection of brake fluid into the thrust chamber 76.

Figure 7:
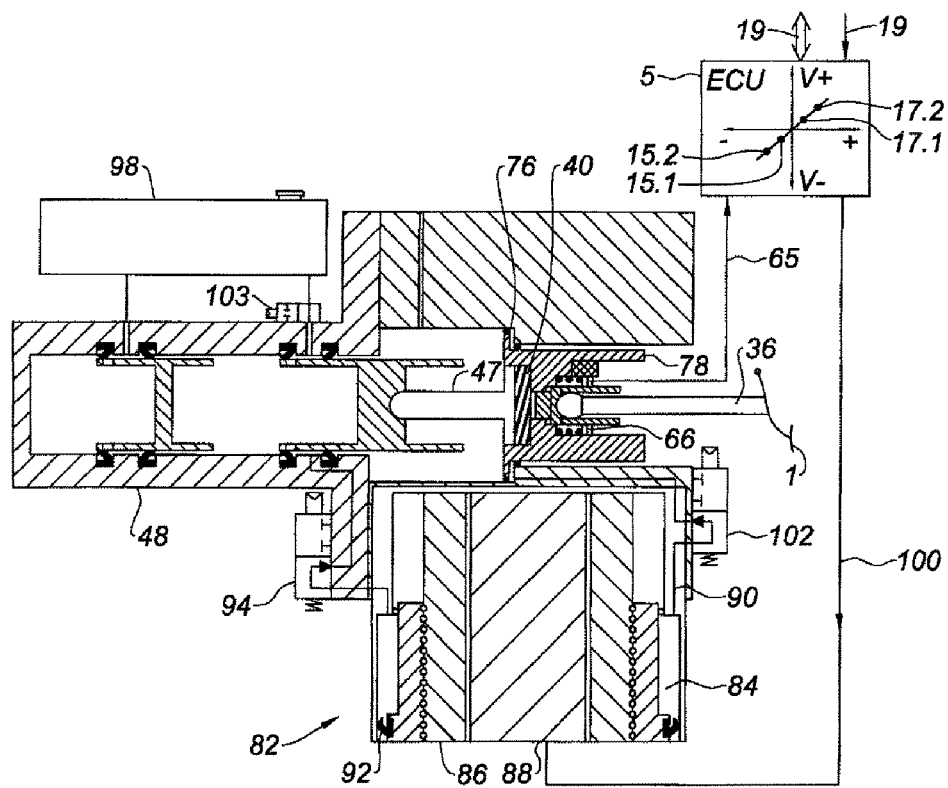
FIG. 7 is a schematic view in section of a sixth exemplary embodiment of a booster according to the present invention.

In the example illustrated in FIG. 7, the pressure source 116 supplying the thrust chamber 76 comprises a master cylinder 82 comprising a variable-volume chamber 84 in which the pressure of the brake fluid is increased by a piston 86 driven, on command 100, by a motor 88, advantageously an electric motor.

In the example illustrated in FIG. 4, the chamber 84 is an annular chamber connected via a line 90 to the thrust chamber 76. Advantageously, the motor is a stepping motor and drives the piston 86 via a recirculating ball screw.

In the advantageous example illustrated, the piston 86 comprises, at least at one of its axial ends, a hydraulic seal capable of withstanding the control pressures and, preferably, as illustrated, a seal of the cup type.

Advantageously, the booster according to the present invention further comprises an electrically operated valve 94 which is closed at rest and which, on command, hermetically seals a line 96 connecting the chamber 84 to the master cylinder 48. In the advantageous example illustrated, the line 96 opens on the master cylinder 48 side between two cups which, in the known way, delimit a resupply chamber of the master cylinder. This chamber is also connected to a reservoir 98 of brake fluid. Further, at rest, the resupply chamber is connected by openings made in the primary piston to the primary chamber of the master cylinder 48. Contrastingly, when the primary piston moves forward, the openings travel beyond the anterior cup allowing the pressure in the braking circuit to increase. In the event of a failure of the motor 88 during braking, the electrically operated valve 94 allows the pressure in the chamber 84 to be released into the reservoir 98 thus avoiding, in the event of a motor 88 failure, undesired braking. Likewise, it should be noted that in the absence of boost following a failure of the motor 88, thrust on the control rod directly drives the thrust rod 47 without the need to drive the motor 88.

Advantageously, the booster according to the present invention comprises a second electrically operated valve 102 which, on command, isolates the thrust chamber 76 from the chamber 84 of the master cylinder 82. Thus it is possible to maintain a hydraulic braking pressure that remains constant irrespective of action of the motor. That may be beneficial, for example, for constant pressures on the brake pedal, for example when stationary at a red traffic light, when stationary for prolonged periods or when driving down a hill under constant braking. Thus, there is no need in such instances to actuate the motor 88. The electrical power consumption and wear of the motor are thus reduced. The second electrically operated valve 102 is particularly beneficial if reversible screws are being used, that is to say screws that can be turned by a variation in pressure in the driving chamber 76.

Advantageously, the booster according to the present invention further comprises a third electrically operated valve 103 which, on command, isolates the primary chamber of the master cylinder 48 from the brake fluid reservoir 98. It is thus possible to prefill the braking circuit through the master cylinder by opening the electrically operated valve 94 and closing the valve 103 so as to prevent the pressure supply to the primary chamber from escaping to the reservoir. It should be noted that the prefilling of the brakes is performed without any forward movement of the control rod 36 or, therefore, of the brake pedal 1. Likewise, the combination of the electrically operated valves 94 being open and the electrically operated valve 103 being closed means that active braking modes, that is to say modes at the command of the control unit 5, can be implemented without the need for driver action and without any movement of the pedal 1. It should be noted that the secondary piston transmits to the secondary chamber the pressure obtaining in the primary chamber, notably during active braking.

The prefilling of the braking may be highly beneficial in reducing stopping distances and/or in allowing use of a hydraulic brake with increased piston retreat which has a zero and/or at the very least reduced residual (undesired) braking torque.

Furthermore, the electrically operated valve 103 or any other means of hermetic isolation on command, can be actuated to cause it to isolate at least one of the chambers of the master cylinder 48, typically the primary chamber, so as, for example, to reduce the dead travel at the time of actuation of the brakes and preferably before the resupply holes in the primary piston have moved beyond the front cup of the primary chamber of the master cylinder or, if an abnormally high temperature has been detected under braking that carries the risk of causing the brake fluid to boil if the brakes are released. However, upon complete release of the brakes, that is to say when there is no pressure on the brake pedal, possibly following a time delay, the electrically operated valve 103 is reopened so as to avoid undesired braking.

The invention applies notably to the automotive industry.
The invention applies mainly to the braking industry.

What is claimed is:

1. Hydraulic brake booster comprising a thrust chamber (76) receiving, on command, a pressurized hydraulic fluid that drives a hydraulic piston (78) that drives a piston of a master cylinder (48), characterized in that the booster comprises a source of pressurized hydraulic liquid (116) provided with an electric motor (88) driving a hydraulic fluid pressurizing device and in that the booster further comprises a control unit (5) for controlling the pressure and/or volume of the fluid delivered, on command, by the source (116) to the thrust chamber (76); and
    wherein the booster further comprises a reservoir (98) that receives hydraulic fluid from the source of pressurized hydraulic fluid (116), the reservoir coupled to both the source of pressurized hydraulic fluid (116) and to the master cylinder (48).

2. A booster according to claim 1, characterized in that the booster further comprises: a set of moving gear comprising a component (32) driven by a member via which the driver actuates braking; and a position sensor (66) that senses a position of the component (32), the component (32) being connected to an input of the control unit (5).

3. A booster according to claim 1, characterized in that the pressure source (116) comprises a master cylinder (82) driven on command by the motor (88).

4. A booster according to claim 3, characterized in that the master cylinder (82) comprises an annular chamber (84).

5. A booster according to claim 1, characterized in that the pressure source (116) comprises a pump (215) driven by the motor (88).

6. A booster according to claim 1, characterized in that the booster comprises means (118) of hermetically isolating, on command, the supply of pressurized fluid to the thrust chamber (76).

7. A booster according to claim 1, further comprising a connection (217) between the master cylinder (48) and the source of pressurized hydraulic fluid (116) which, on command, allows brake fluid to be injected into a chamber of the master cylinder (48).

8. A booster according to claim 7, wherein the connection (217) opens into a resupply chamber of the master cylinder.

9. A booster according to claim 7, wherein the connection (217) opens directly into one of a plurality of chambers of the master cylinder (48) other than the resupply chamber.

* * * * *